US012759480B2

(12) United States Patent
Suzuki et al.

(10) Patent No.: US 12,759,480 B2
(45) Date of Patent: Oct. 13, 2026

(54) VEHICLE INTERIOR MATERIAL

(71) Applicants: NIHON PLAST CO., LTD., Fujinomiya (JP); HONDA MOTOR CO., LTD., Tokyo (JP)

(72) Inventors: Takashi Suzuki, Shizuoka (JP); Takayuki Nakatake, Tokyo (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 440 days.

(21) Appl. No.: 18/224,171

(22) Filed: Jul. 20, 2023

(65) Prior Publication Data

US 2024/0025354 A1 Jan. 25, 2024

(30) Foreign Application Priority Data

Jul. 22, 2022 (JP) ................................ 2022-116881

(51) Int. Cl.
*B60R 13/02* (2006.01)

(52) U.S. Cl.
CPC ................................ *B60R 13/0206* (2013.01)

(58) Field of Classification Search
CPC .................................................. B60R 13/0206
See application file for complete search history.

(56) References Cited

U.S. PATENT DOCUMENTS 5,704,753 A * 1/1998 Ueno .................... F16B 21/086 411/908
11,274,690 B2 * 3/2022 Leverger ............... F16B 21/075
11,572,011 B1 * 2/2023 Carrillo Fernandez ...................... B60Q 1/0441
2007/0253796 A1 * 11/2007 Kawai ................... F16B 45/008 411/508
2008/0289155 A1 * 11/2008 Kim ....................... B60J 3/0213 24/295
2012/0317757 A1 * 12/2012 Risdale ............... B29C 45/1635 24/458
2014/0284962 A1 * 9/2014 Mally ................ B60R 13/0243 296/146.7

(Continued)

FOREIGN PATENT DOCUMENTS

CN 210949395 7/2020
JP 2014-019231 2/2014

*Primary Examiner* — Taras P Bemko
(74) *Attorney, Agent, or Firm* — Amin, Turocy & Watson, LLP

(57) ABSTRACT

A vehicle interior material includes an interior material main body portion and an attachment section protruding from the interior material main body portion and inserted into an opening portion of an attached section. The vehicle interior material is attached to the attached section by locking the attachment section to the opening portion. The attachment section includes a plate-like portion extending in a predetermined direction from the interior material main body portion, a pair of slits formed in the plate-like portion along the predetermined direction, and a locking base positioned between the slits, extending in the predetermined direction, and elastically deformable in a thickness direction of the plate-like portion. The locking base has a protrusion that is raised in the thickness direction and locked to the opening portion, and includes a portion having different cross-sectional areas on a proximal end portion side and a distal end portion side with respect to the protrusion.

5 Claims, 3 Drawing Sheets

(56) References Cited

U.S. PATENT DOCUMENTS

2015/0202949 A1 * 7/2015 Ogino ................ B60R 13/0206
49/465

* cited by examiner

VEHICLE INTERIOR MATERIAL

CROSS REFERENCE TO RELATED APPLICATIONS

This application is entitled to and claims the benefit of Japanese Patent Application No. 2022-116881 filed on Jul. 22, 2022, the disclosure of which including the specification, drawings and abstract is incorporated herein by reference in its entirety.

TECHNICAL FIELD

The present invention relates to a vehicle interior material that is attached to an attached section by locking an attachment section to an opening portion.

BACKGROUND ART

In the related art, it is known that an interior material made of a synthetic resin or the like used in a vehicle such as an automobile is provided with an attachment claw, and is attached to an attached section by inserting and locking the attachment claw into an opening portion of the attached section. In the attachment claw, a pair of slits is formed in a plate-like portion extending from an interior material main body portion, and a protrusion locked to an edge portion of the opening portion is raised and formed in the plate-like portion between the slits is formed (refer to, for example, PTL 1).

CITATION LIST

Patent Literature

PTL 1

Japanese Patent Application Laid-Open No. 2014-19231 (page 5, FIGS. 3 to 5)

SUMMARY OF INVENTION

Technical Problem

In the case of the attachment claw as described above, by lengthening a length of the slit, the plate-like portion between the slits can be easily elastically deformed, making it possible to reduce an insertion force required for the attachment. However, a removal force required to remove the attachment claws is also reduced accordingly. Therefore, it is required to be able to set the insertion force and the removal force individually.

The present invention is made in consideration of the above-described matters, and an object thereof is to provide a vehicle interior material in which an assembly load to an attached section and difficulty of removal from the attached section can be individually set.

Solution to Problem

According to claim 1, there is provided an vehicle interior material including: an interior material main body portion; and an attachment section protruding from the interior material main body portion and inserted into an opening portion of an attached section, in which the vehicle interior material is attached to the attached section by locking the attachment section to the opening portion, the attachment section includes a plate-like portion extending in a predetermined direction from the interior material main body portion, a pair of slits formed in the plate-like portion along the predetermined direction, and a locking base positioned between the slits, extending in the predetermined direction, and elastically deformable in a thickness direction of the plate-like portion, and the locking base has a protrusion that is raised in the thickness direction of the plate-like portion and locked to and held by the opening portion by interference of a proximal end portion side of the locking base with the opening portion and includes a portion having different cross-sectional areas on the proximal end portion side and a distal end portion side with respect to the protrusion.

In a vehicle interior material according to claim 2, in the vehicle interior material according to claim 1, the locking base has a minimum cross-sectional region having a minimum cross-sectional area on the proximal end portion side with respect to the protrusion.

In a vehicle interior material according to claim 3, in the vehicle interior material according to claim 2, the minimum cross-sectional region has a smaller width dimension than the other portions of the locking base.

In a vehicle interior material according to claim 4, in the vehicle interior material according to claim 2, the minimum cross-sectional region has a smaller thickness dimension than the other portions of the locking base. In a vehicle interior material according to claim in the vehicle interior material according to claim 3, the minimum cross-sectional region has a smaller thickness dimension than the other portions of the locking base.

Advantageous Effects of Invention

According to the vehicle interior material of claim 1, according to the cross-sectional area on the proximal end portion side and the cross-sectional area on the distal end portion side with respect to the protrusion, it is possible to individually set an assembly load of the vehicle interior material to an attached section and difficulty in removal of the vehicle interior material from the attached section.

According to the vehicle interior material of claim 2, in addition to the effects of the vehicle interior material of claim 1, while an insertion force required to insert the attachment section into the opening portion can be set relatively small, reduction in a removal force required to remove the attachment section from the opening portion can be suppressed. Therefore, the vehicle interior material can be easily assembled to the attached section at a low cost, and the vehicle interior material is less likely to come off from the attached section.

According to the vehicle interior material of claim 3, in addition to the effects of the vehicle interior material of claim 2, the cross-sectional area of the minimum cross-sectional region can be easily set small.

According to the vehicle interior material of claim 4, in addition to the effects of the vehicle interior material of claim 2 or 3, the cross-sectional area of the minimum cross-sectional region can be easily set small.

DESCRIPTION OF EMBODIMENTS

Hereinafter, an embodiment of the present invention will be described with reference to the drawings.

Figure 4A:
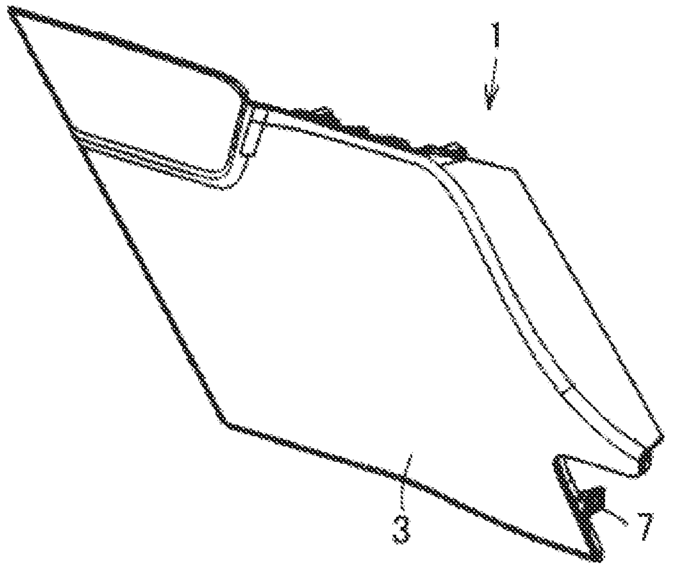
FIG. 4A is a perspective view illustrating the vehicle interior material from a front surface side.
Figure 4B:
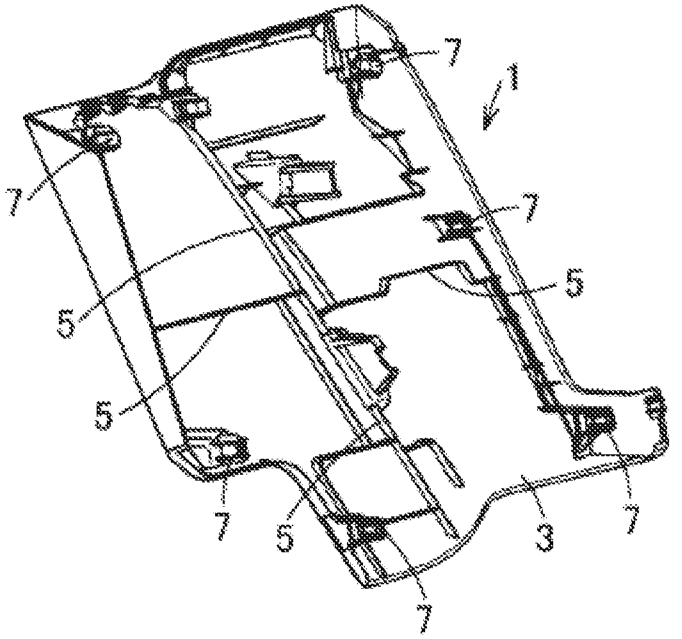
FIG. 4B is a perspective view illustrating the vehicle interior material from a rear surface side.

In FIGS. 4A and 4B, a reference numeral 1 indicates a vehicle interior material. In the present embodiment, vehicle interior material 1 is used, for example, as a part of an instrument panel for a vehicle such as an automobile. In the present embodiment, vehicle interior material 1 is made of synthetic resin, for example.

Vehicle interior material 1 includes interior material main body portion 3. Interior material main body portion 3 constitutes a design portion of vehicle interior material 1. Interior material main body portion 3 is a main portion of vehicle interior material 1. Interior material main body portion 3 is formed in a predetermined shape that covers at least a portion of attached section 4 (FIG. 2) to which vehicle interior material 1 is attached. In the present embodiment, interior material main body portion 3 is formed in a plate-like shape and has a rectangular appearance, but it is not limited to this, and may have any shape according to a shape of an arrangement position, desired design, or the like.

Rib 5 for reinforcement or the like is formed on a rear surface of interior material main body portion 3. Ribs 5 are formed vertically and horizontally at appropriate locations. Attachment section 7 is formed on the rear surface of interior material main body portion 3. Preferably, a plurality of attachment sections 7 are arranged on the rear surface of interior material main body portion 3. In the illustrated example, attachment section 7 is positioned near an outer edge portion of the rear surface of interior material main body portion 3.

Figure 2:
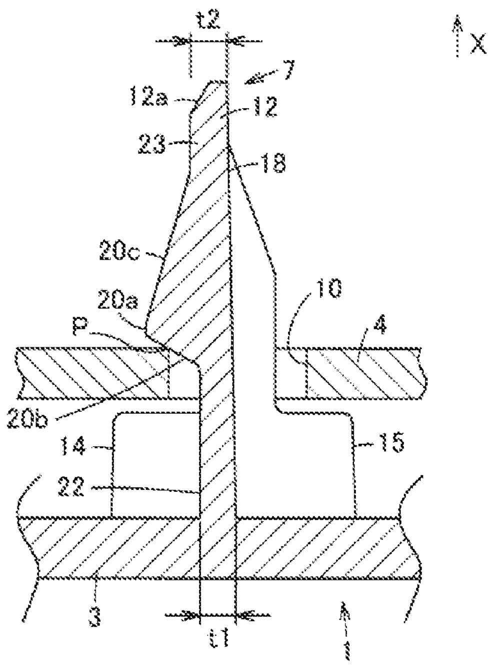
FIG. 2 is a cross-sectional view at a position corresponding to I-I in FIG. 1.

As illustrated in FIG. 2, attachment section 7 is a portion for attaching vehicle interior material 1 to attached section 4. Attachment section 7 is also called an attachment claw or the like. Attachment section 7 is inserted into opening portion 10 formed in attached section 4, and is locked to and held by opening portion 10, and thus, attachment section 7 is held in a state where vehicle interior material 1 is attached to attached section 4.

Figure 1:
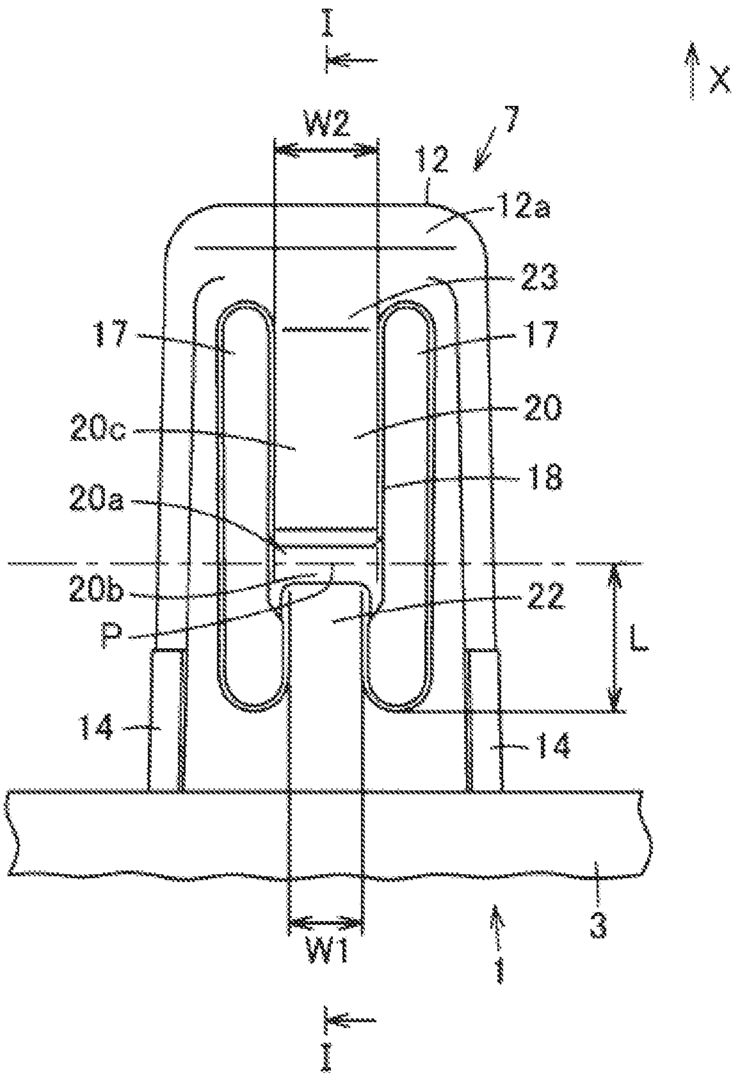
FIG. 1 is a front view illustrating an attachment section of a vehicle interior material according to an embodiment of the present invention.
Figure 3:
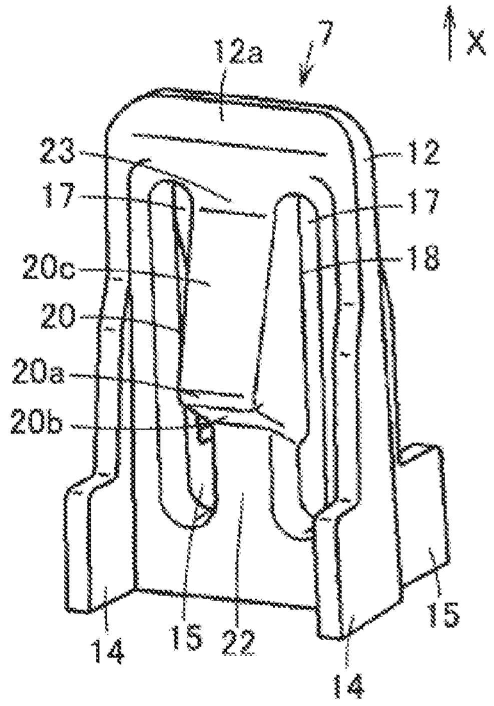
FIG. 3 is a perspective view of the attachment section.

Then, as illustrated in FIGS. 1 to 3, attachment section 7 has plate-like portion 12 extending from the rear surface of interior material main body portion 3 in a predetermined direction (up-down direction in FIGS. 1 to 3, indicated by an arrow X), for example, along the direction of insertion into opening portion 10 of attachment section 7. Plate-like portion 12 has a plate-like shape having a thickness direction in a direction that intersects or is orthogonal to the direction extending from interior material main body portion 3. Plate-like portion 12 is formed with a predetermined width dimension and has a rectangular shape elongated in a predetermined direction when viewed from the front surface.

Preferably, plate-like portion 12 is formed such that a width thereof gradually narrows slightly from a proximal end portion toward a distal end portion. That is, plate-like portion 12 is formed so that the width on the distal end portion side is narrower than the width on the proximal end portion side. On one main surface (left surface in FIG. 2) of plate-like portion 12, an inclined portion **12*a*** is formed to be inclined so that the thickness gradually decreases toward the distal end.

Plate-like portion 12 has rib portions 14 and 15 for reinforcement formed on both side edge portions of one main surface and the other main surface. Rib portions 14 and 15 are formed along the side edge portions of one main surface and the other main surface of plate-like portion 12 and protrude from plate-like portion 12 in the thickness direction.

A pair of slits 17 are formed in plate-like portion 12. In the present embodiment, a pair of slits 17 is formed. Slits 17 are formed through plate-like portion 12 in the thickness direction. Slits 17 are positioned to be spaced apart from each other in the width direction of plate-like portion 12, that is, a direction (right-left direction in FIG. 1) intersecting or orthogonal to the predetermined direction and the thickness direction of plate-like portion 12. Moreover, slit 17 has a longitudinal shape extending along a longitudinal direction of plate-like portion 12, that is, along the predetermined direction. In the illustrated example, slits 17 extend in parallel or substantially parallel straight lines. Further, slit 17 extends from a position near the proximal end portion of plate-like portion 12 to a position near the distal end portion. Both end portions of slit 17 are positioned inside an outer shell of plate-like portion 12. Slit 17 is positioned to be spaced apart from the inside of plate-like portion 12 with respect to rib portions 14 and 15. One end portion of slit 17 is spaced apart from interior material main body portion 3, and the distal end portion of slit 17 is positioned closer to interior material main body portion 3 side than the distal end portion of plate-like portion 12. Locking base 18 extending in a predetermined direction is formed between slits 17.

Locking base 18 is formed in a plate-like shape having the same thickness direction as plate-like portion 12. Moreover, locking base 18 is formed in a rectangular shape elongated in a predetermined direction. Both end portions of locking base 18 are integrally formed with plate-like portion 12. Locking base 18 is formed to be elastically deformable in the thickness direction of plate-like portion 12 by slits 17.

Locking base 18 is formed with protrusion 20 raised in the thickness direction of plate-like portion 12 on one main surface (left surface in FIG. 2). The other main surface (right surface in FIG. 2) of locking base 18 has flat surface shape flush or substantially flush with the other main surface of plate-like portion 12.

Protrusion 20 is positioned to be spaced apart from the proximal end portion, which is the end portion of locking base 18 on interior material main body portion 3 side, toward the distal end portion side, which is the end portion on the opposite side. In addition, in the present embodiment, protrusion 20 is positioned to be spaced apart slightly from the distal end portion of locking base 18 toward the proximal end portion side. That is, in the present embodiment, locking base 18 has proximal end-side portion 22 formed on the proximal end portion side and distal end-side portion 23 formed on the distal end portion side based on protrusion 20. Protrusion 20 is positioned closer to the distal end portion in the longitudinal direction of locking base 18. That is, proximal end-side portion 22 is formed longer than distal end-side portion 23 in the longitudinal direction of locking base 18.

Protrusion 20 has top portion **20*a* that is the most raised, first surface 20*b* that is gradually inclined from the proximal end portion side toward top portion 20*a*, and second surface 20*c* that is gradually inclined from the distal end portion side toward top portion 20*a*. That is, protrusion 20 protrudes from one main surface of locking base 18 in a triangular shape with top portion 20*a*** as a vertex in a cross-sectional view.

In the present embodiment, top portion 20*a* is positioned closer to the proximal end portion, that is, closer to proximal end-side portion 22 than the central portion of locking base 18 in the longitudinal direction. First surface 20*b* and second surface 20*c* are inclined in opposite directions in the thickness direction of locking base 18, and first surface 20*b* is steeper than second surface 20*c* with respect to the longitudinal direction of locking base 18. For example, the inclination of first surface 20*b* is 45° or more and less than 90° with respect to the longitudinal direction of locking base 18, and the inclination of second surface 20*c* is less than 45° with respect to the longitudinal direction of locking base 18. The position of first surface 20*b* near top portion 20*a* interferes with the edge portion of opening portion 10 of attached section 4, so that protrusion 20 is locked to and held by opening portion 10. That is, on first surface 20*b*, there is engagement position (claw hooking position) P where protrusion 20 is locked to the edge portion of opening portion 10 at a position spaced apart from top portion 20*a* toward the proximal end portion side of locking base 18, that is, toward proximal end-side portion 22 side. Engagement position P is a linear position that extends across both sides of protrusion 20 in the width direction.

First surface 20*b* continues to proximal end-side portion 22 of locking base 18. Second surface 20*c* extends to the vicinity of the distal end portion of locking base 18 and continues to distal end-side portion 23.

Proximal end-side portion 22 is formed in a plate-like shape. Proximal end-side portion 22 constitutes the proximal end portion of locking base 18. Proximal end-side portion 22 is the portion where the most stress is applied when attachment section 7 is inserted into opening portion 10 and protrusion 20 climbs over the edge portion of opening portion 10, i.e., when attachment section 7 is attached to opening portion 10. First surface continues to proximal end-side portion 22 of locking base 18. Second surface 20*c* extends to the vicinity of the distal end portion of locking base 18 and continues to distal end-side portion 23.

Similarly, distal end-side portion 23 is formed in a plate-like shape. Distal end-side portion 23 constitutes the distal end portion of locking base 18. Distal end-side portion 23 is the portion where the most stress is applied when protrusion 20 is pressed against the edge portion of opening portion 10 to remove attachment section 7 from opening portion 10, that is, when attachment section 7 is removed from opening portion 10.

Locking base 18 has a portion with different cross-sectional areas on the proximal end portion side and the distal end portion side with respect to protrusion 20. In the present embodiment, locking base 18 has different cross-sectional areas at proximal end-side portion 22 and distal end-side portion 23. In the illustrated example, proximal end-side portion 22 is set to have a smaller cross-sectional area than distal end-side portion 23.

Proximal end-side portion 22 has constant or substantially constant width dimension W1 in the longitudinal direction of locking base 18. Width dimension W1 is smaller than width dimension W2 of protrusion 20 and distal end-side portion 23. That is, proximal end-side portion 22 has a smaller width dimension than the other portions of locking base 18. In the present embodiment, width dimension W2 of protrusion 20 and distal end-side portion 23 is the same or substantially the same, and is constant or substantially constant in longitudinal direction of locking base 18. Therefore, the width dimension of slit 17 is larger at the side portion of proximal end-side portion 22 than at the position of the side portions of protrusion 20 and the position of distal end-side portion 23.

Moreover, proximal end-side portion 22 has constant or substantially constant thickness dimension t1 that is smaller than protrusion 20 and distal end-side portion 23. In the illustrated example, thickness dimension t1 is smaller than thickness dimension t2 of distal end-side portion 23. That is, proximal end-side portion 22 has a smaller thickness dimension than the other portions of locking base 18. In the present embodiment, in proximal end-side portion 22, one principal surface side is recessed with respect to distal end-side portion 23, and the other principal surface side is flush or substantially flush with distal end-side portion 23.

Therefore, in locking base 18, proximal end-side portion 22, which is closer to the proximal end portion side than protrusion 20 or engagement position P based on protrusion or engagement position P, becomes a minimum cross-sectional region having the minimum cross-sectional area in the predetermined direction, that is, the direction orthogonal to the longitudinal direction, that is, the thickness direction. In the present embodiment, entire proximal end-side portion 22 is the minimum cross-sectional region. That is, the minimum cross-sectional region continues in the longitudinal direction from protrusion 20 or engagement position P to the proximal end proximal end portion of locking base 18.

In a case where vehicle interior material 1 is attached to attached section 4, when vehicle interior material 1 is pushed in the predetermined direction to so that vehicle interior material 1 approaches attached section 4 in a state where attachment section 7 is aligned with opening portion 10, attachment section 7 is inserted into opening portion 10. In this case, in attachment section 7, second surface 20*c* of protrusion 20 interferes with the edge portion of opening portion 10, a stress in the thickness direction is generated in locking base 18 according to the relatively gentle inclination of second surface 20*c* as vehicle interior material 1 is pushed in, and locking base 18 is elastically deformed in the thickness direction at the position of proximal end-side portion 22. When top portion 20*a* of protrusion 20 climbs over the edge portion of opening portion 10, locking base 18 is restored and deformed by the elasticity of proximal end-side portion 22, first surface 20*b* of protrusion 20 is hooked on the edge portion of opening portion 10 at engagement position P, and thus, vehicle interior material 1 is locked to attached section 4.

In vehicle interior material 1 attached to attached section 4, protrusion 20 interferes with the edge portion of opening portion 10 against a force in the direction opposite to the predetermined direction, but first surface 20*b*, since the inclination is steep with respect to the longitudinal direction of locking base 18 which is the predetermined direction and the length of distal end-side portion 23 is short, most of the generated stress is received by protrusion 20 and distal end-side portion 23. Thus, the locking of protrusion 20 to opening portion 10 is maintained within a stress range at which locking base 18 is not elastically deformed in the thickness direction, and vehicle interior material 1 is held by attached section 4.

In this way, when attachment section 7 is inserted into opening portion 10 in the predetermined direction and attached, the interference with the edge portion of opening portion 10 forces protrusion 20 toward the proximal end portion side from the distal end portion side and the inclination of second surface 20*c* of protrusion 20 is relatively gentle with respect to the predetermined direction. Accordingly, the force is greatly converted in the thickness direction by the inclination of second surface 20*c*, and thus, in locking base 18, proximal end-side portion 22 is most stressed. Therefore, depending on the length, elasticity, and cross-sectional area of proximal end-side portion 22, an insertion force required to insert attachment section 7 into opening portion 10, that is, an assembly load when attaching vehicle interior material 1 to attached section 4 is set.

Meanwhile, when attachment section 7 is removed from opening portion 10, a force is applied to protrusion 20 from the proximal end portion side to the distal end portion side due to interference with the edge portion of opening portion 10 and the inclination of first surface 20*b* of protrusion 20 is relatively steep with respect to the predetermined direction. Accordingly, since the force is not greatly converted in the thickness direction by the inclination of second surface 20*c* and distal end-side portion 23 is short, in locking base 18, the stresses applied to distal end-side portion 23 dominate over the stresses applied to proximal end-side portion 22. Therefore, a removal force required to remove attachment section 7 from opening portion 10, that is, a holding force for holding vehicle interior material 1 to attached section 4 is set depending on the length, elasticity, and cross-sectional area of distal end-side portion 23.

Specifically, as the cross-sectional areas of proximal end-side portion 22 and distal end-side portion 23 decrease, the insertion force (assembly load) and the removal force (holding force) decrease.

Therefore, by forming locking base 18 so that a portion having a different cross-sectional area is generated on the proximal end portion side and the distal end portion side with respect to protrusion 20, according to the cross-sectional area of proximal end portion side and the cross-sectional area of distal end portion side with respect to protrusion 20, the insertion force and the removal force, that is, the assembly load of vehicle interior material 1 to attached section 4 and difficulty in the removal of vehicle interior material 1 from attached section 4 can be set individually, thereby improving convenience.

That is, in the related art in which the insertion force (assembly load) and the removal force (holding force) are set by adjusting the length of slit 17, particularly lengthening length L of slit 17 at the position of the side portion of proximal end-side portion 22, for example, when length L of slit 17 increases to facilitate the elastic deformation of proximal end-side portion 22 and reduce the insertion force (assembly load), the length of proximal end-side portion 22 is long. Accordingly, the stress generated when removing attachment section 7 from opening portion 10 tends to act on proximal end-side portion 22, and the removal force (holding force) is also reduced. That is, in the case of adjusting the length of slit 17, the insertion force (assembly load) and the removal force (holding force) increase or decrease at the same time.

Meanwhile, in the present embodiment, since the insertion force (assembly load) and the removal force (holding force) are adjusted by the cross-sectional areas on the proximal end side and the distal end side of protrusion 20 in locking base 18, it is possible to separately set the insertion force (assembly load) and the removal force (holding force) without changing the lengths of proximal end-side portion 22 and distal end-side portion 23, and for example, since it is not necessary to lengthen slit 17 so that proximal end-side portion 22 is easily elastically deformed in order to suppress the insertion force (assembly load), the total length of attachment section 7 can be kept low. Therefore, in attached section 4, attachment section 7 does not protrude greatly behind opening portion 10 into which attachment section 7 is inserted, and the space behind opening portion 10 can be effectively utilized.

In particular, in the present embodiment, since proximal end-side portion 22 which becomes the minimum cross-sectional region having the minimum cross-sectional area is set on the proximal end portion side with respect to protrusion 20 of locking base 18, while the insertion force required to insert attachment section 7 into opening portion 10 can be set relatively small, the removal force required to remove attachment section 7 from opening portion 10 can be prevented from decreasing. Therefore, without using a separate clip or the like, vehicle interior material 1 can be easily assembled to attached section 4 at a low cost, and vehicle interior material 1 is less likely to come off from attached section 4.

By making the width dimension of proximal end-side portion 22, which become the minimum cross-sectional region, smaller than the other portions of locking base 18, the cross-sectional area of proximal end-side portion 22 can be easily set small.

Similarly, by making the thickness dimension of proximal end-side portion 22, which becomes the minimum cross-sectional region, smaller than the other portions of locking base 18, the cross-sectional area of proximal end-side portion 22 can be easily set small.

In the above embodiment, the cross-sectional areas of proximal end-side portion 22 and distal end-side portion 23 are set by adjusting only one of width dimensions W1 and W2 and thickness dimensions t1 and t2.

Further, when the portion having a different cross-sectional area can be formed on the proximal end portion side and the distal end portion side based on protrusion 20 in locking base 18, width dimensions W1 and W2 and thickness dimensions t1 and t2 may not be constant.

Distal end-side portion 23 is not an essential configuration, and protrusion 20 may constitute the distal end portion of locking base 18 and be connected adjacent to plate-like portion 20. In this case, in locking base 18, when proximal end-side portion 22 and the portion on the distal end portion side of protrusion 20 have different cross-sectional areas, the same effects as those of the above-described embodiment can be obtained.

Although attachment section 7 protrudes linearly in the direction perpendicular or substantially perpendicular to interior material main body portion 3 as an example, attachment section 7 is not limited to this, and attachment section 7 can be applied even when attachment section 7 protrudes obliquely or protrudes in an arc shape or the like with respect to interior material main body portion 3.

INDUSTRIAL APPLICABILITY

The present invention can be suitably used as a vehicle interior material used for an instrument panel of a vehicle such as an automobile.

REFERENCE SIGNS LIST

1 Vehicle interior material
3 Interior material main body portion
4 Attached section
7 Attachment section
10 Opening portion
12 Plate-like portion
17 Slit
18 Locking base

20 Protrusion

22 Proximal end-side portion which is minimum cross-sectional region

What is claimed is:

1. A vehicle interior material comprising:

an interior material main body portion; and an attachment section protruding from the interior material main body portion and inserted into an opening portion of an attached section, wherein the vehicle interior material is attached to the attached section by locking the attachment section to the opening portion, the attachment section includes a plate-like portion extending in a predetermined direction from the interior material main body portion, a pair of slits formed in the plate-like portion along the predetermined direction, and a locking base that is plate-shaped having a same thickness direction as the plate-like portion, both end portions of the locking base being integrally formed with the plate-like portion, the locking base being positioned between the slits, extending in the predetermined direction, and elastically deformable in the thickness direction of the plate-like portion, and the locking base includes:

a proximal end-side portion;

a distal end-side portion; and a protrusion that is provided between the proximal end-side portion and the distal end-side portion, raised from one main surface of the locking base in the thickness direction of the plate-like portion and locked to and held by the opening portion by interference of the locking base with the opening portion, the other main surface of the locking base is flush or substantially flush with the other main surface of the plate-like portion, the protrusion has a first surface inclined from the proximal end-side portion toward a top portion with respect to a longitudinal direction of the locking base, and a second surface inclined from the top portion toward the distal end-side portion with respect to the longitudinal direction of the locking base, the first surface and the second surface are inclined in opposite directions with respect to a thickness direction of the locking base, an inclination angle of the first surface is greater than an inclination angle of the second surface, and the locking base has different cross-sectional areas at the proximal end-side portion and the distal end-side portion.

2. The vehicle interior material according to claim 1, wherein the proximal end-side portion is a minimum cross-sectional region having a minimum cross-sectional area in the locking base.

3. The vehicle interior material according to claim 2, wherein the proximal end-side portion has a smaller width dimension than the other portions of the locking base.

4. The vehicle interior material according to claim 3, wherein the proximal end-side portion has a smaller thickness dimension than the other portions of the locking base.

5. The vehicle interior material according to claim 2, wherein the proximal end-side portion has a smaller thickness dimension than the other portions of the locking base.

* * * * *